United States Patent
Lim et al.

(10) Patent No.: US 9,030,306 B2
(45) Date of Patent: May 12, 2015

(54) APPARATUS AND METHOD FOR 3 DEGREE OF FREEDOM (3DOF) TACTILE FEEDBACK

(75) Inventors: Soo Chul Lim, Seoul (KR); Joon Ah Park, Seoul (KR); Hyung Kew Lee, Gunpo-si (KR); Bho Ram Lee, Seongnam-si (KR); Seung Ju Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 114 days.

(21) Appl. No.: 13/612,033

(22) Filed: Sep. 12, 2012

(65) Prior Publication Data
US 2013/0088341 A1    Apr. 11, 2013

(30) Foreign Application Priority Data
Oct. 6, 2011    (KR) .................. 10-2011-0101692

(51) Int. Cl.
*H04B 3/36* (2006.01)
*G06F 3/01* (2006.01)

(52) U.S. Cl.
CPC ....................... *G06F 3/016* (2013.01)

(58) Field of Classification Search
CPC ....................................................... G08B 6/00
USPC .......................................... 340/407.1, 407.2
See application file for complete search history.

(56) References Cited

U.S. PATENT DOCUMENTS

| 6,443,292 B1 * | 9/2002 | Grund .................. 198/444 |
| 2002/0054060 A1 * | 5/2002 | Schena ................. 345/701 |
| 2009/0036212 A1 * | 2/2009 | Provancher .............. 463/37 |
| 2010/0292706 A1 * | 11/2010 | Dutson et al. .......... 606/130 |

FOREIGN PATENT DOCUMENTS

| JP | 06-018341 | 1/1994 |
| JP | 2000-089895 | 3/2000 |
| KR | 10-2007-0067448 | 6/2007 |
| KR | 10-2009-0050601 | 5/2009 |

* cited by examiner

*Primary Examiner* — Hai Phan
*Assistant Examiner* — Zhen Y Wu
(74) *Attorney, Agent, or Firm* — NSIP Law

(57) ABSTRACT

A 3 degree of freedom (3DOF) tactile feedback apparatus and method are provided. The 3DOF tactile feedback apparatus may include a movable unit that may move in at least one direction to be in contact with human skin, and an actuator to move the movable unit based on an input signal.

25 Claims, 6 Drawing Sheets

APPARATUS AND METHOD FOR 3 DEGREE OF FREEDOM (3DOF) TACTILE FEEDBACK

CROSS-REFERENCE TO RELATED APPLICATIONS

This application claims the priority benefit of Korean Patent Application No. 10-2011-0101692, filed on Oct. 6, 2011, in the Korean Intellectual Property Office, the disclosure of which is incorporated herein by reference.

BACKGROUND

1. Field

Embodiments relate to an apparatus and method for feeding back a three-dimensional (3D) force vector, a texture, and the like to a sensory organ of a human being, and more particular, to an apparatus and method for transferring feedback information about a force vector, a texture, and the like to a tactile organ of a human being by expressing the feedback information as a physical movement.

2. Description of the Related Art

Equipment used for tasks or surgeries, among industrial equipment or medical equipment, performed by controlling a robot at a remote distance has been generalized. A field associated with the foregoing is referred to as a tele-operation field.

However, when the robot is controlled by a human, a physical quantity representing a tension, a load, or another force that is currently being applied to the robot may not be fed back to the human controlling the robot in a form of a tactile sense due to a unidirectional feedback of a force.

Conventionally, research on a feedback of a force with respect to a load of a moving direction or bending of a robot joint has been conducted actively. However, research on a feedback of an intuitive physical quantity by transferring a tactile sense to human skin has been conducted relatively infrequently.

In a computer simulation for education or entertainment, as well as a robot control field, a tactile feedback may be used to perform a simulation providing a much greater sense of reality by feeding a virtual physical force back to a hand or skin of a human so that the human may experience a tactile sensation.

A technique for feeding back a force or tactile sense is also referred to as haptic feedback. In this instance, the more delicately a force applied to an object or a robot is fed back to a finger of a human, the more sophisticatedly the object or the robot is controlled.

Accordingly, there is a need for a technology for delicately feeding back force applied to an object or a robot.

SUMMARY

In an aspect of one or more embodiments, there is provided a three degree of freedom (3DOF) tactile feedback apparatus, including a movable unit that may move in at least one direction to be in contact with human skin, and an actuator to move the movable unit based on an input signal.

The actuator may feed back at least one of a force applied to an object, a movement, a texture, and a surface shape to the human skin, by moving the movable unit in a 3DOF direction.

The 3DOF direction may include a horizontal direction, a vertical direction, and front and back directions.

The actuator may include a first actuator to move the movable unit in a horizontal direction based on the input signal, a second actuator to move at least one pin included in the movable unit in a vertical direction based on the input signal, and a third actuator to move the movable unit in front and back directions based on the input signal.

The second actuator may move the at least one pin in the horizontal direction and the front and back directions in response to a movement of the movable unit.

The apparatus may further include an intermediate medium formed of a material having a high coefficient of friction and, disposed on a contact surface of the movable unit.

The apparatus may further include an oscillating unit to transfer an oscillation to the movable unit based on the input signal.

The actuator may move the movable unit by adjusting an air pressure of a balloon based on the input signal.

The actuator may move the movable unit in at least one direction of the front and back directions and the horizontal direction using a piezoelectric motor.

The input signal may correspond to a feedback signal including a load that may be applied to an object through a tele-operation.

In an aspect of one or more embodiments, there is provided a three degree of freedom (3DOF) tactile feedback method using a 3DOF tactile feedback apparatus including a movable unit and an actuator, the method including receiving an input signal, and moving, by the actuator, the movable unit in at least one direction based on the input signal.

The moving of the movable unit may include moving the movable unit in a horizontal direction based on the input signal, moving at least one pin included in the movable unit in a vertical direction based on the input signal, and moving the movable unit in front and back directions based on the input signal.

The method may further include bringing an intermediate medium disposed on a contact surface of the movable unit into contact with human skin.

The method may further include transferring an oscillation to the movable unit based on the input signal.

According to another aspect of one or more embodiments, there is provided at least one non-transitory computer readable medium storing program instructions (computer readable instructions) to implement methods of one or more embodiments.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
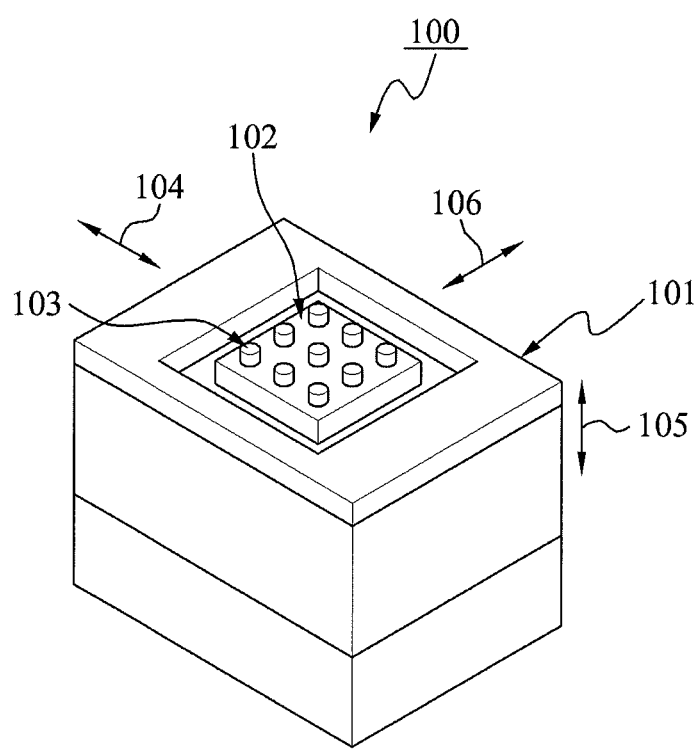
FIG. 1 illustrates a perspective view of a 3 degree of freedom (3DOF) tactile feedback apparatus using a pin array scheme according to an embodiment.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 is a perspective view illustrating a 3 degree of freedom (3DOF) tactile feedback apparatus 100 using a pin array scheme according to an embodiment.

Referring to FIG. 1, the 3DOF tactile feedback apparatus 100 may include a fixed unit 101, a movable unit 102, and an actuator 103.

The fixed unit 101 may refer to a body surrounding the movable unit 102 and the actuator 103, and may limit a range of a movement of the movable unit 102.

The movable unit 102 may move within the fixed unit 101 to feedback a tactile sense to human skin. For example, the movable unit 102 may move in at least one direction of a horizontal direction 104 corresponding to a direction of an axis X, a vertical direction 105 corresponding to a direction of an axis Y, and front and back directions 106 corresponding to a direction of an axis Z. A contact surface of the movable unit 102 may be in contact with the human skin, for example, an inside part of a finger.

The actuator 103 may control the movable unit 102 to move in the at least one direction, based on an input signal. Here, the input signal may correspond to a feedback signal including a load that may be applied to an object during a tele-operation. Here, the object may refer to various types of objects provided in a virtual space or a robot positioned in a remote area.

For example, when an object positioned in a virtual space or in a remote area is controlled through a tele-operation, an input signal to be fed back to the 3DOF tactile feedback apparatus may include a signal corresponding to a force applied to the object, a movement, a texture, and a surface shape.

Hereinafter, a detailed configuration in which an actuator may move in a horizontal direction, a vertical direction, and front and back directions to feed a tactile sense back to a human will be described with reference to FIG. 2.

Figure 2:
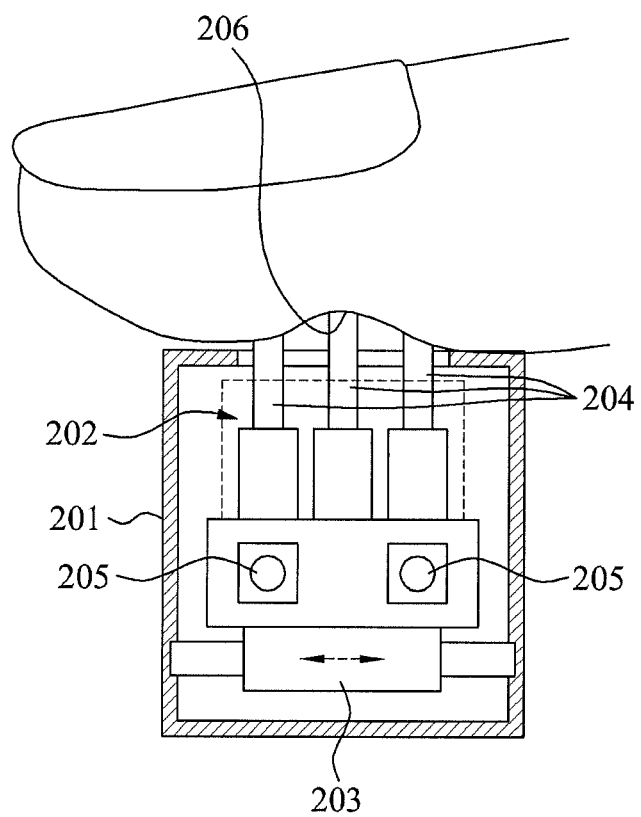
FIG. 2 illustrates a cross-sectional view of a configuration of a 3DOF tactile feedback apparatus according to an embodiment.

FIG. 2 is a cross-sectional view illustrating a configuration of a 3DOF tactile feedback apparatus according to an embodiment.

Referring to FIG. 2, the 3DOF tactile feedback apparatus may include a fixed unit 201, a movable unit 202, a first actuator 203, a second actuator 204, and a third actuator 205. Here, since an operation of the fixed unit 201 is identical to the operation of the fixed unit 101 of FIG. 1, duplicated descriptions will be omitted for conciseness.

In FIG. 2, the first actuator 203, the second actuator 204, and the third actuator 205 may control a movement of the movable unit 202 and a movement of a pin array simultaneously in a horizontal direction, in a vertical direction, and front and back directions, respectively, thereby generating tactile stimulation to human skin with sense of reality.

The first actuator 203 may control the movement of the movable unit 202 in a horizontal direction based on an input signal. In this instance, the first actuator 203 may move the movable unit 202 in a left horizontal direction and a right horizontal direction using a piezoelectric motor.

For example, when an object moves in a left or right direction, the input signal may include a movement vector indicating a movement velocity and a movement direction of the object. The first actuator 203 may move the movable unit 202 at the movement velocity of object in a left or right direction based on the input signal, thereby feeding back the movement applied to the object to human skin through a contact surface of the movable unit 202 and a contact surface of each pin forming the pin array in contact with an inside part 206 of a finger.

The second actuator 204 may include the pin array including at least one pin, and the pin array may be inserted in the movable unit 202. In this instance, each of the at least one pin forming the pin array may move independently. The second actuator 204 may be disposed on an upper end of the third actuator 205 to control a movement of each of the at least one pin in an up/down vertical direction based on the input signal.

As an example, when the object presses down on an uneven plane, the input signal may include a texture of the uneven plane and a force vector corresponding to a pressing force. The second actuator 204 may move each of the at least one pin forming the pin array to have different heights, based on the input signal received from the object, thereby feeding back the uneven texture, the force, and the surface shape applied to the object to human skin through contact surfaces of the at least one pin in contact, at different heights, with the inside part 206 of the finger.

As another example, when the object moves at a velocity 'A' in a right direction along a plane inclined in a direction from an upper left to a lower right, the first actuator 203 may move the movable unit 202 in a right direction based on the input signal, and the second actuator 204 may adjust the heights of the at least one pin based on the input signal. For example, the further right a pin forming the pin array is located, the lower height of the corresponding pin. In this instance, the first actuator 203 and the second actuator 204 may move the movable unit 202 and the pin array simultaneously. For example, when the movable unit 202 moves at a velocity 'A' in a right direction, a contact surface of the pin array may move at the velocity 'A' in the right direction in response to the movement of the movable unit 202, and the height of the pin array may decrease to be in contact with the inside part 206 of the finger, thereby simultaneously feeding back the movement in vertical and horizontal directions applied to the object, the force, and the inclined plane, and the like to human skin.

The third actuator 205 may control the movement of the movable unit 202 in front and back directions based on the input signal. In this instance, the third actuator 205 may be disposed on a lower end of the movable unit 202 and on an upper end of the first actuator 203 to move the movable unit 202 using at least one piezoelectric motor.

For example, when the object moves in a diagonal direction, the first actuator 203 may move the movable unit 202 in a horizontal direction based on the input signal, and the third actuator 203 may move the movable unit 202 in front and back directions based on the input signal. In this instance, the first actuator 203 and the third actuator 205 may move the movable unit 202 in the horizontal direction and in the front and back directions simultaneously, thereby feeding back the movement in the diagonal direction applied to the object to human skin.

As aforementioned, the 3DOF tactile feedback apparatus may simultaneously control both the movement of the movable unit 202 and the movement of the pin array using the first actuator 203, the second actuator 204, and the third actuator 205, thereby feeding back at least one of the force in the horizontal, vertical, front and back directions applied to the object, the movement, the texture, the surface shape to the human skin.

In other words, the pin array may move in a direction in which the movable unit 202 moves, in response to the movement of the movable unit 202. For example, when the movable unit 202 moves in a horizontal direction, the pin array included in the movable unit 202 may move in the horizontal direction, in conjunction with the movable unit 202. When the movable unit 202 moves in front and back directions, the pin array included in the movable unit 202 may move in the front and back directions in conjunction with the movable unit 202. When the movable unit 202 moves in horizontal, and front and back directions, the pin array included in the movable unit 202 may move in the horizontal, and front and back directions in conjunction with the movable unit 202. In this instance, the pin array may move in at least one direction of the horizontal, and front and back directions in response to the movement of the movable unit 202, and each pin may move independently in a vertical direction based on the input signal. Each pin forming the pin array may move in at least one direction of the horizontal, vertical, front and back directions, thereby feeding back at least one of a force applied to the object, a movement, a texture, and a surface shape to human skin, to generate tactile stimulation.

Therefore, the 3DOF tactile feedback apparatus may generate more sensitive and sophisticated tactile stimulation to human skin by controlling the movement of the movable unit 202 and the movement of the pin array in a 3DOF direction including the horizontal, vertical, front and back directions.

Figure 3:
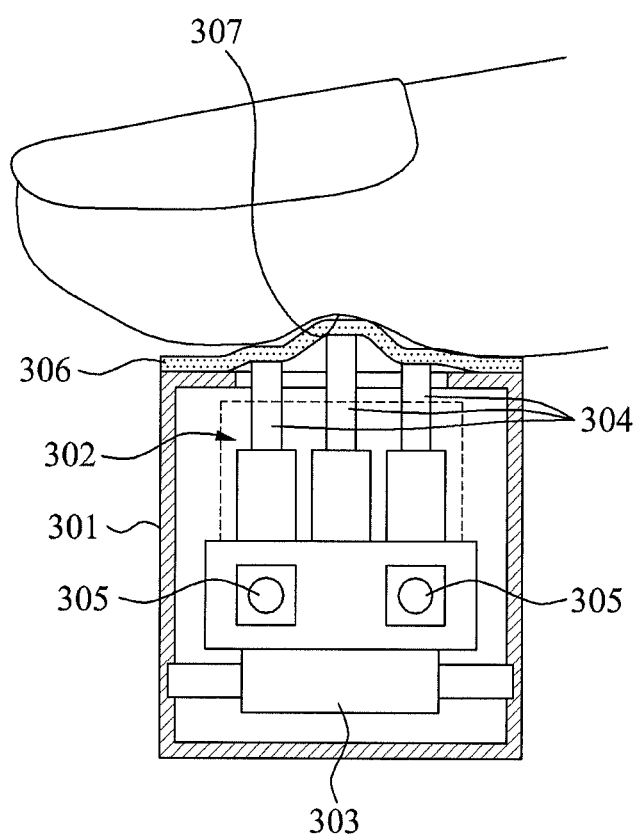
FIG. 3 illustrates a cross-sectional view of a configuration of a 3DOF tactile feedback apparatus according to an embodiment.

FIG. 3 is a cross-sectional view illustrating a configuration of a 3DOF tactile feedback apparatus according to an embodiment.

Referring to FIG. 3, the 3DOF tactile feedback apparatus may include a fixed unit 301, a movable unit 302, a first actuator 303, a second actuator 304, a third actuator 305, and an intermediate medium 306.

In this instance, the 3DOF tactile feedback apparatus of FIG. 3 may have a configuration of the 3DOF tactile feedback apparatus of FIG. 2 further including the intermediate medium 306. Accordingly, an operation of the fixed unit 301 of FIG. 3 may be identical to the operation of the fixed unit 201 of FIG. 2, and operations of the movable unit 302, the first actuator 303, the second actuator 304, and the third actuator 305 may be identical to the operations of the movable unit 202, the first actuator 203, the second actuator 204, and the third actuator 205 and thus, duplicated descriptions will be omitted for conciseness.

Similar to FIG. 2, the first actuator 303 may control a movement of the movable unit 302 in a left horizontal direction and a right horizontal direction, the second actuator 304 may control the movement of the movable unit 302 in an up vertical direction and a down vertical direction, and the third actuator 305 may control the movement of the movable unit 302 in front and back directions.

The first actuator 303, the second actuator 304, and the third actuator 305 may simultaneously control both the movement of the movable unit 202 and a movement of a pin array in the horizontal direction, in the vertical direction, and the front and back directions, respectively, thereby feeding back a force applied to an object, a movement, a texture, a surface shape to human skin more elaborately.

The intermediate medium 306 may be disposed on contact surfaces of the actuator 302 and the pin array, and may move as the movable unit 302 moves in horizontal, vertical, front and back directions. In other words, the intermediate medium 306 may move in response to the movement of the movable unit 302, and a surface of the intermediate medium 306 may be in contact with human skin. Accordingly, the intermediate medium 306 may feed back the force in the horizontal, vertical, front and back directions applied to the object, the movement, the texture, and the surface shape to human skin.

In this instance, the intermediate medium 306 may include a material having a high coefficient of friction. For example, the intermediate medium 306 may be formed using a material that may generate a great deal of sensitivity and sophisticated tactile stimulation to an inside part 307 of a finger when the inside part 306 of the finger touches the material. The material may include, for example, rubber, latex, and the like.

The intermediate medium 306 may be replaced with another material that may feed back the tactile stimulation more sensitively depending on a location where the object desired to be controlled is positioned, a situation, and an environmental condition.

Figure 4:
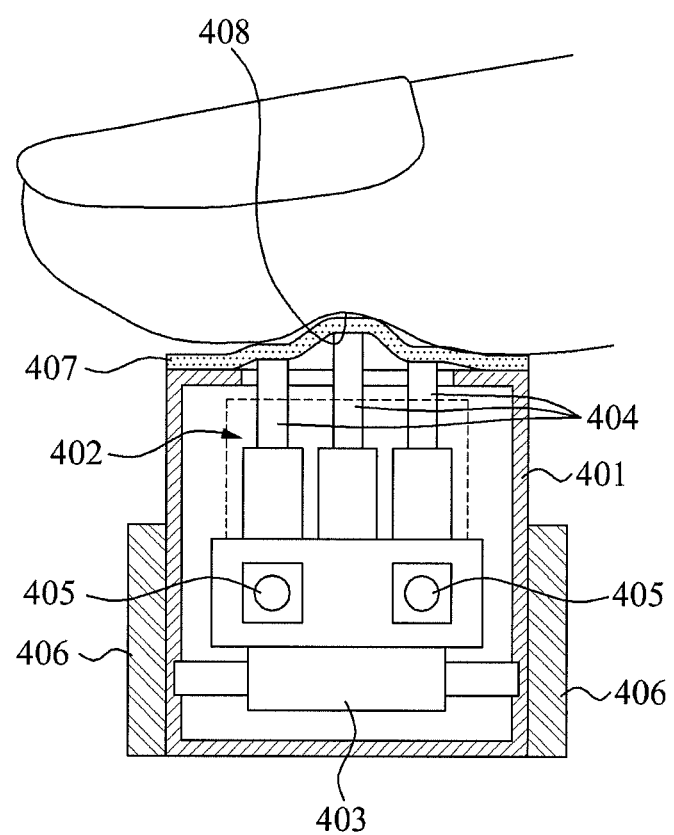
FIG. 4 illustrates a cross-sectional view of a configuration of a 3DOF tactile feedback apparatus according to an embodiment.

FIG. 4 is a cross-sectional view illustrating a configuration of a 3DOF tactile feedback apparatus according to an embodiment.

Referring to FIG. 4, the 3DOF tactile feedback apparatus may include a fixed unit 401, a movable unit 402, a first actuator 403, a second actuator 404, a third actuator 405, and an oscillating unit 406. Here, the 3DOF tactile feedback apparatus may further include an intermediate medium 407.

In this instance, the 3DOF tactile feedback apparatus of FIG. 4 may have a configuration of the 3DOF tactile feedback apparatus of FIG. 3 further including the oscillating unit 406. Accordingly, operations of the fixed unit 401, the movable unit 402, the first actuator 403, the second actuator 404, the third actuator 405, and the intermediate medium 407 may be identical to the operations of the fixed unit 301, the movable unit 302, the first actuator 303, the second actuator 304, the third actuator 305, and the intermediate medium 306 and thus, duplicated descriptions will be omitted for conciseness.

The oscillating unit 406 may transfer an oscillation to the movable unit 402 based on an input signal, and may be disposed to be in contact with an outside face of the fixed unit 401. For example, when the 3DOF tactile feedback apparatus has a regular tetrahedral form, the oscillating unit 406 may be disposed to be in contact with at least one of four outside faces of the fixed unit 401.

In this instance, the oscillating unit 406 may transfer a sense of an oscillation to an inside part 408 of a finger by generating a high-frequency oscillation using an oscillating body.

For example, similar to a case in which an object is in contact with a predetermined surface, when it is difficult to generate a tactile sense to human skin by adjusting a height of a pin array since a force vector is extremely small, the oscillating unit 406 may generate a minute oscillation, and may transfer the generated oscillation to the inside part 406 of the finger, thereby generating tactile stimulation with respect to a strength of the extremely small force. The oscillating unit 406 may transfer, to human skin, a delicate change in the predetermined surface in contact with the object as well as a change in a material of the predetermined surface, using the oscillation.

In this instance, the oscillating unit 406 may generate the oscillation simultaneously when the first actuator 402, the second actuator 403, and the third actuator 404 control the movements of the movable unit 402 and the pin array in horizontal, vertical, front and back directions. Accordingly, the oscillating unit 406 may feed back the delicate change in the horizontal, vertical, front and back directions applied to the object to human skin.

Figure 5:
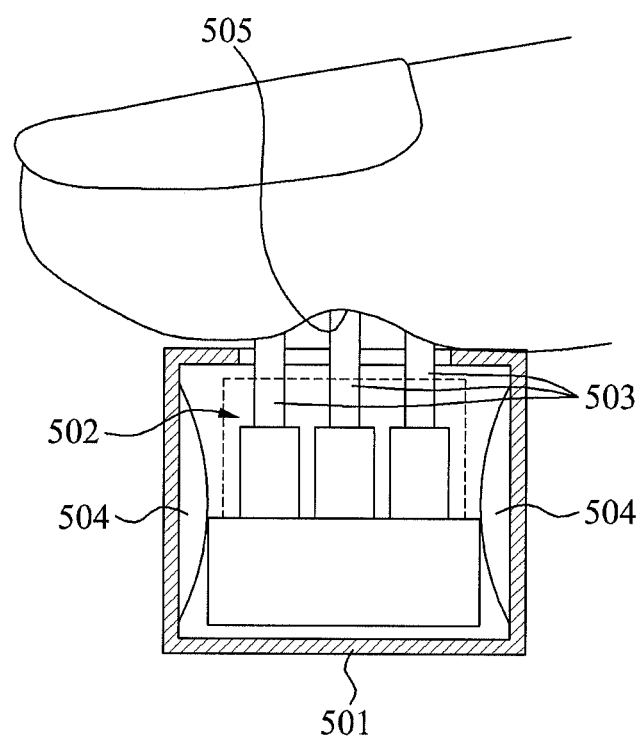
FIG. 5 illustrates a cross-sectional view of a configuration of a 3DOF tactile feedback apparatus according to an embodiment.

FIG. 5 is a cross-sectional view illustrating a configuration of a 3DOF tactile feedback apparatus according to an embodiment.

Referring to FIG. 5, the 3DOF tactile feedback apparatus may include a fixed unit 501, a movable unit 502, and actuators 503 and 504. The 3DOF tactile feedback apparatus of FIG. 5 may have a configuration using a balloon, instead of using the piezoelectric motor used for controlling a movement of a movable unit in horizontal, and front and back directions as described with reference to FIGS. 1 through 4.

The actuator 504 may move the movable unit 502 in a left horizontal direction, a right horizontal direction and front and back directions by adjusting an air pressure of the balloon based on an input signal. In this instance, the actuator 504 may be disposed to be in contact with an inside face of the fixed unit 501.

For example, when the 3DOF tactile feedback apparatus has a regular tetrahedral form, the actuator 504 may adjust air pressures of balloons positioned on four respective faces. In this instance, air may be injected into an air injection tube (not shown) of a balloon through an air injection apparatus (not shown) based on the input signal. The balloon may gradually inflate to transfer force to the movable unit 502. Accordingly, the movable unit 502 may move in a direction in which the force is transferred. The movement may generate tactile stimulation through contact surfaces of the movable unit 502 and the pin array of actuator 503 that are in contact with an inside part 505 of a finger.

When the actuator 504 transfers the force to the movable unit 502 by respectively adjusting the air pressures of the balloons positioned on the four faces, the movable unit 502 may move in the horizontal, and front and back directions.

In this instance, the balloons positioned on the four faces may be disposed on respective sides, in a symmetrical structure. For example, a first balloon and a second balloon may be disposed to face each other, in a symmetrical structure, to control the movement of the movable unit 502 in a left horizontal direction and a right horizontal direction. A third balloon and a fourth balloon may be disposed to face each other, in a symmetrical structure, to control the movement of the movable unit 502 in front and back directions.

The 3DOF tactile feedback apparatus of FIG. 5 may include one or both of the intermediate medium 306 of FIG. 3 and the oscillating unit 406 of FIG. 4.

Figure 6:
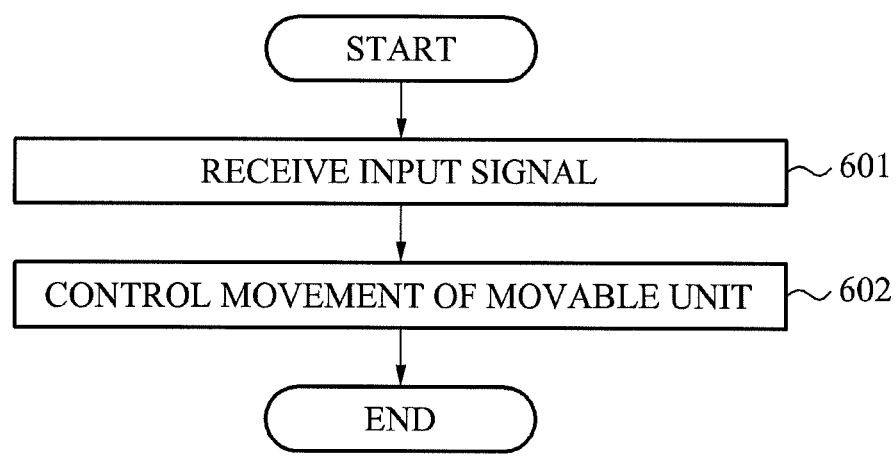
FIG. 6 illustrates a flowchart of an operation of the 3DOF tactile feedback apparatus of FIG. 1.

FIG. 6 is a flowchart illustrating an operation of the 3DOF tactile feedback apparatus 100 of FIG. 1.

In operation 601, the 3DOF tactile feedback apparatus 100 may receive an input signal from an object positioned in a remote or virtual space. Here, the input signal may correspond to a feedback signal including a load that may be applied to an object through a tele-operation.

In operation 602, the 3DOF tactile feedback apparatus 100 may control an actuator to move a movable unit in at least one direction, based on the input signal.

In this instance, the actuator may feed back at least one of a force applied to an object, a movement, a texture, and a surface shape to human skin by moving the movable unit in a 3DOF direction. Here, the 3DOF direction may include a horizontal direction, a vertical direction, and front and back directions.

A piezoelectric motor, a pin array, and a balloon may be used for controlling the movement of the movable unit in horizontal, vertical, front and back directions.

As an example, when the piezoelectric motor and the pin array are used as an actuator, the 3DOF tactile feedback apparatus 100 may move the movable unit in a left horizontal direction and a right horizontal direction using a first piezoelectric motor. The 3DOF tactile feedback apparatus 100 may move the movable unit in front and back directions using a second piezoelectric motor. In this instance, a plurality of piezoelectric motors may be used to move the movable unit in the front and back directions. The 3DOF tactile feedback apparatus 100 may move the movable unit in a vertical direction by adjusting a height of each pin forming a pin array. Here, the pin array may be inserted in the movable unit. In this instance, the 3DOF tactile feedback apparatus 100 may generate tactile stimulation through contact surfaces of the movable unit and the pin array that are in contact with an inside part of a finger, by operating the first piezoelectric motor, the second piezoelectric motor, and the pin array simultaneously based on an input signal.

The 3DOF tactile feedback apparatus 100 may include an intermediate medium disposed on the contact surfaces of the movable unit and the pin array, and may generate the tactile stimulation to human skin through the intermediate medium. Here, the intermediate medium may be formed of a material having a high coefficient of friction, and may have an exchangeable form The 3DOF tactile feedback apparatus 100 may transfer, to the movable unit, an oscillation generated using an oscillating body based on the input signal. That is, the 3DOF tactile feedback apparatus 100 may transfer, to the human skin, a delicate change applied to the object using the oscillating body, thereby generating sophisticated tactile stimulation.

As another example, when a balloon and a pin array are used as an actuator, the 3DOF tactile feedback apparatus 100 may move the movable unit in horizontal, and front and back directions, using the balloon. For example, the 3DOF tactile feedback apparatus 100 may move the movable unit in a left horizontal direction and a right horizontal direction by adjusting air pressures of a first balloon and a second balloon based on an input signal. The 3DOF tactile feedback apparatus 100 may move the movable unit in front and back directions by adjusting air pressures of a third balloon and a fourth balloon based on the input signal. In this instance, the first balloon and the second balloon may be disposed to face each other in a symmetrical structure. The third balloon and the fourth balloon may be disposed to face each other in a symmetrical structure. The 3DOF tactile feedback apparatus 100 may move pins forming the pin array in a vertical direction based on the input signal, thereby feeding back a force in the vertical direction applied to the object, a movement, a texture, a surface shape to human skin.

As aforementioned, the 3DOF tactile feedback apparatus 100 may move the movable unit, and the pin array inserted in the movable unit simultaneously in horizontal, vertical, and front and back directions, thereby feeding back a haptic sensitivity in the horizontal applied to the object, vertical, front and back directions to human skin.

The 3DOF tactile feedback apparatus 100 may be attached to or built in an operating unit of a tele-operation. When the 3DOF tactile feedback apparatus 100 may be built in the operating unit, the fixed unit may be built in as a part of a configuration of the operating unit.

Also, the 3DOF tactile feedback apparatus 100 may be used for a gaming interface or a device providing sense of reality through a virtual simulation as well as a tele-operation.

As aforementioned, a 3DOF tactile feedback apparatus and method according to one or more embodiment of the present disclosure may provide a tactile feedback by delicately transferring, to a finger or skin of a human, feedback information about a force vector, a texture, and the like according to a control of an object positioned in a virtual space or a robot at a remote distance, thereby increasing a sophistication of the control of the object or the robot.

Also, sense of reality of a simulation may increase through the tactile feedback.

The methods according to the above-described embodiments may be recorded in non-transitory computer-readable media including program instructions to implement various operations implemented by a computer to cause at least one processor to execute or perform the program instructions (computer readable instructions). The non-transitory computer readable media may also include, alone or in combination with the program instructions, data files, data structures, and the like. Examples of program instructions include both machine code, such as produced by a compiler, and files containing higher level code that may be executed by the computer using an interpreter.

The non-transitory compute readable media and program instructions may be those specially designed and constructed, or they may be of the kind well-known and available to those having skill in the computer software arts. Examples of non-transitory computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner. In addition, the computer-readable storage media may also be embodied in at least one application specific integrated circuit (ASIC) or Field Programmable Gate Array (FPGA).

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A three degree of freedom (3DOF) tactile feedback apparatus, comprising:
   a movable unit, which is in contact with human skin, and which moves in at least one direction while in contact with human skin; and
   an actuator to move the movable unit based on an input signal,
   wherein the actuator comprises:
   a first actuator to move the movable unit in a horizontal direction based on the input signal;
   a second actuator to move at least two pins included in the movable unit in a vertical direction based on the input signal;
   a third actuator, disposed on an upper portion of the first actuator, to move the movable unit in front/back directions based on the input signal,
   wherein the at least two pins are included in a plurality of pins forming a pin array, wherein each pin of the pin array moves independently, and
   wherein the second actuator is disposed on an upper portion of the third actuator.

2. The apparatus of claim 1, wherein the actuator feeds back at least one of a force applied to an object, a movement, a texture, and a surface shape to the human skin, by moving the movable unit in a 3DOF direction.

3. The apparatus of claim 1, wherein the 3DOF direction comprises a horizontal direction, a vertical direction, and front/back directions.

4. The apparatus of claim 1, wherein the second actuator moves the at least two pins in the vertical direction in response to a movement of the movable unit in the horizontal direction and the front/back directions.

5. The apparatus of claim 1, further comprising:
   an intermediate medium formed of a material having a high coefficient of friction and, disposed on a contact surface of the movable unit to form part of the movable unit.

6. The apparatus of claim 1, further comprising:
   an oscillating unit to transfer an oscillation to the movable unit based on the input signal.

7. The apparatus of claim 1, wherein the actuator moves the movable unit by adjusting an air pressure of a balloon based on the input signal.

8. The apparatus of claim 1, wherein the actuator moves the movable unit in at least one direction of the front/back directions and the horizontal direction using a piezoelectric motor.

9. The apparatus of claim 1, wherein the input signal corresponds to a feedback signal including a load that is applied to an object through a tele-operation.

10. The apparatus of claim 1, wherein the first actuator, the second actuator, and the third actuator control movement of the movable unit and movement of at least two pins in the pin array simultaneously.

11. The apparatus of claim 1, wherein the input signal is a feedback signal corresponding to at least one of a force applied to an object, a movement of the object, a texture of the object, and a surface shape of the object.

12. The apparatus of claim 11, wherein a robot applies a force to the object.

13. The apparatus of claim 11, wherein a robot moves the object.

14. A three degree of freedom (3DOF) tactile feedback method using a 3DOF tactile feedback apparatus comprising a movable unit and an actuator, the method comprising:
   receiving an input signal; and
   moving, by the actuator, the movable unit in at least one direction based on the input signal,
   wherein the movable unit is in contact with human skin while the movable unit is moving,
   wherein the actuator comprises a first actuator, a second actuator and a third actuator,
   wherein the moving of the movable unit comprises:
   moving, by the first actuator, the movable unit in a horizontal direction based on the input signal; and
   moving, by the second actuator, at least two pins included in the movable unit in a vertical direction based on the input signal; and
   moving, by the third actuator, the movable unit in front/back directions based on the input signal,
   wherein the at least two pins are included in a plurality of pins forming a pin array, wherein each pin of the pin array moves independently,
   wherein the third actuator is disposed on an upper portion of the first actuator, and
   wherein the second actuator is disposed on an upper portion of the third actuator.

15. The method of claim 14, wherein the moving of the movable unit comprises feeding back at least one of a force applied to an object, a movement, a texture, and a surface shape to the human skin, by moving the movable unit in a 3DOF direction.

16. The method of claim 15, wherein the 3DOF direction comprises a horizontal direction, a vertical direction, and front/back directions.

17. The method of claim 14, wherein the moving of the at least two pins comprises moving the at least two pins in response to a movement of the movable unit in the horizontal direction and the front/back directions.

18. The method of claim 14, further comprising:
bringing an intermediate medium disposed on a contact surface of the movable unit into contact with human skin to form part of the movable unit.

19. The method of claim 14, further comprising:
transferring an oscillation to the movable unit based on the input signal.

20. The method of claim 14, wherein the moving of the movable unit comprises moving the movable unit by adjusting an air pressure of a balloon based on the input signal.

21. The method of claim 14, wherein the moving the movable unit in the horizontal direction, the moving the at least one pin in the movable unit in the vertical direction, and the moving the movable unit in the front/back directions occurs simultaneously.

22. The method of claim 11, wherein the input signal is a feedback signal corresponding to at least one of a force applied to an object, a movement of the object, a texture of the object, and a surface shape of the object.

23. The method of claim 22, wherein a robot applies a force to the object.

24. The method of claim 22, wherein a robot moves the object.

25. At least one non-transitory computer-readable medium storing a program to control at least one processor to perform the method of claim 14.

* * * * *